INVENTOR.
WILLY A. E. SCHOELZ

ATTORNEYS

United States Patent Office 2,927,991
Patented Mar. 8, 1960

2,927,991

AUTOMATIC RESISTANCE WELDING SYSTEM FOR WELDING STAINLESS STEEL HONEYCOMB STRUCTURE

Willy A. E. Schoelz, Vancouver, British Columbia, Canada

Application August 24, 1956, Serial No. 606,050

21 Claims. (Cl. 219—87)

This invention relates to a new and improved method of producing stainless steel honeycomb or other thin sheet metal structure of honeycomb type, as utilized by the aircraft industry, to overcome difficulties created by the progressively increasing speeds of aircrafts.

This honeycomb structure may be classed as an anisotropic integrated sheet metal assembly. More particularly, foil thin ribbons arranged in honeycomb pattern form the core, which represent the vital part of the finished honeycomb panel. It will be securely sandwiched between metal facings or skins in a final and different assembling process. The honeycomb core performs the vital function of providing essential continuous support to the facings to prevent buckling under compression, while at the same time resisting shear stresses. The herein described invention deals with the production of the said honeycomb core only. In order to meet the ever increasing demand of the aircraft industry for an assembly able to withstand cutting and machining, as well as a high temperature, the node to node attachment between foil ribbons has to be accomplished by mechanical methods as seam or spot welding. The peculiarity of the construction of the said core contains difficulties in processing, so that the honeycomb core used in the aircraft industry was heretofore manufactured by hand methods. The herein described machine eliminates those costly methods and produces thin sheet metal core automatically with a high precision. By using multiple welding electrodes and a controllable split seam welding system, this machine is capable of producing a honeycomb core panel of any desired width and thickness. More particularly, this machine can be adjusted to produce varied width and thickness of the honeycomb core panel, limited only by the given maximum in both measurements.

In order to comprehend the invention, it is deemed advisable to describe the fundamental ideas previous to the machine description.

As an example it may be assumed that a ¼ inch square cell honeycomb core panel of a width of 4 feet has to be produced. This assumption is given in respect to the specifications of the aircraft industry.

This honeycomb core assembly consists of approximately 128 nodes to be welded by the given size of 4 feet width and ¼ inch square cell. My system covers as many nodes as possible with welding electrodes. Since for a resistance welding system, a pair of electrodes are necessary, one electrode of the pair will be called the horizontal electrode and the other one of the pair will be called the vertical electrode.

The vertical electrodes have the shape and size of one substantially square cell, being able to fit exactly into the said cell and acting as base for the horizontal electrode. There are as many vertical electrodes as there are cells in one line across the panel to be produced. In the given example of a 4 feet wide panel there are 128 vertical electrodes for the 128 nodes to be welded.

The horizontal electrodes are adapted to co-operate with the vertical electrodes against the work piece, whereby the shape and size of the horizontal electrode tips determine the length of the weld itself, producing a short seam weld or elongated spot weld. The horizontal electrodes are arranged in a manner, so that every second or alternate node to be welded is covered with one independent horizontal electrode, herewith covering 50% of the total, or in the given example 64 of the 128 nodes with horizontal electrodes. The remaining 64 first nodes are used to hold the pre-formed corrugated strip to be welded in place as long as the horizontal electrodes are welding the alternate nodes. Each one of the 64 horizontal electrodes is connected with its own welding transformer, which is energized by a welding pulse generator, able to produce 64 suitable welding pulses in a fast sequence. As soon as the first sequence of 64 spots is completed, the horizontal electrodes retract from the work piece, and move by mechanical means into the next higher position for the second sequence of spots or nodes to be welded. This procedure is repeated as often as necessary in order to cover the length of the nodes with a row of spot welds, whereby the number of spots can be chosen at will with the help of a selector switch. By utilizing the proper mechanical means of the described system it is possible to produce not only one given thickness of a honeycomb core panel, but every desired thickness with the same machine.

As soon as the full length of the second node is welded, the horizontal electrodes are retracted and indexed to the first nodes, which up to this time were used for the purpose of holding the strip to be welded in proper position. By completing the last weld of the second node, the strip-holder mechanism moves out of its position, leaving the first node free for the horizontal electrodes to move in. The above described welding procedure now starts in the highest possible position of the first nodes, working its way downwards until the welding of the first nodes is completed. By this a new strip is added to the honeycomb core panel and the whole procedure starts all over again with the following action.

The strip-holding mechanism mentioned above is designed in a way to act at the same time as a pickup mechanism for the strip to be added to the panel. After the last weld of a complete welding cycle is finished, all horizontal and vertical electrodes are retracted from their position, leaving a newly produced row of square cells free. The honeycomb core panel, or such portion produced of it, will now be indexed in a manner, that said cells will move into a position, where the vertical electrodes are able to occupy the newly formed square cells.

In order to place the new corrugated foil strip to be welded in the proper position and to assure the preservation of the square cell form during the welding operation, another row of teeth similar to the vertical electrodes, but fabricated of insulating material, are placed in a holder above the vertical electrodes. The before mentioned holding or pickup mechanism is placed on the same holder and works in co-operation with the insulating teeth. As soon as the vertical electrodes and the insulating teeth are retracted and the panel is moved into its new position, the holding or pickup mechanism selects a pre-formed foil strip having substantially V-shaped corrugations out of a magazine and places it against the insulating teeth. With the vertical electrodes moving into the last row of square cells, the insulating teeth with the new foil strip securely placed in position by the holding-mechanism, also moves into the welding position, placing the new foil strip precisely in a node to node position with the apices of the substantially V-shaped corrugations of the new strip in opposition to the ridges of a previously welded strip. To describe the machine and its function the accompanying drawings consist of the vital parts of this machine and a schematic diagram. The vital parts of the machine are shown in Fig. 1 in a combination necessary for the proper sequence of the action. While Fig. 1 and Fig. 2 mainly serve the purpose of introducing those parts and their composition, the other figures extend this information and explain the function mainly.

Figure 1:
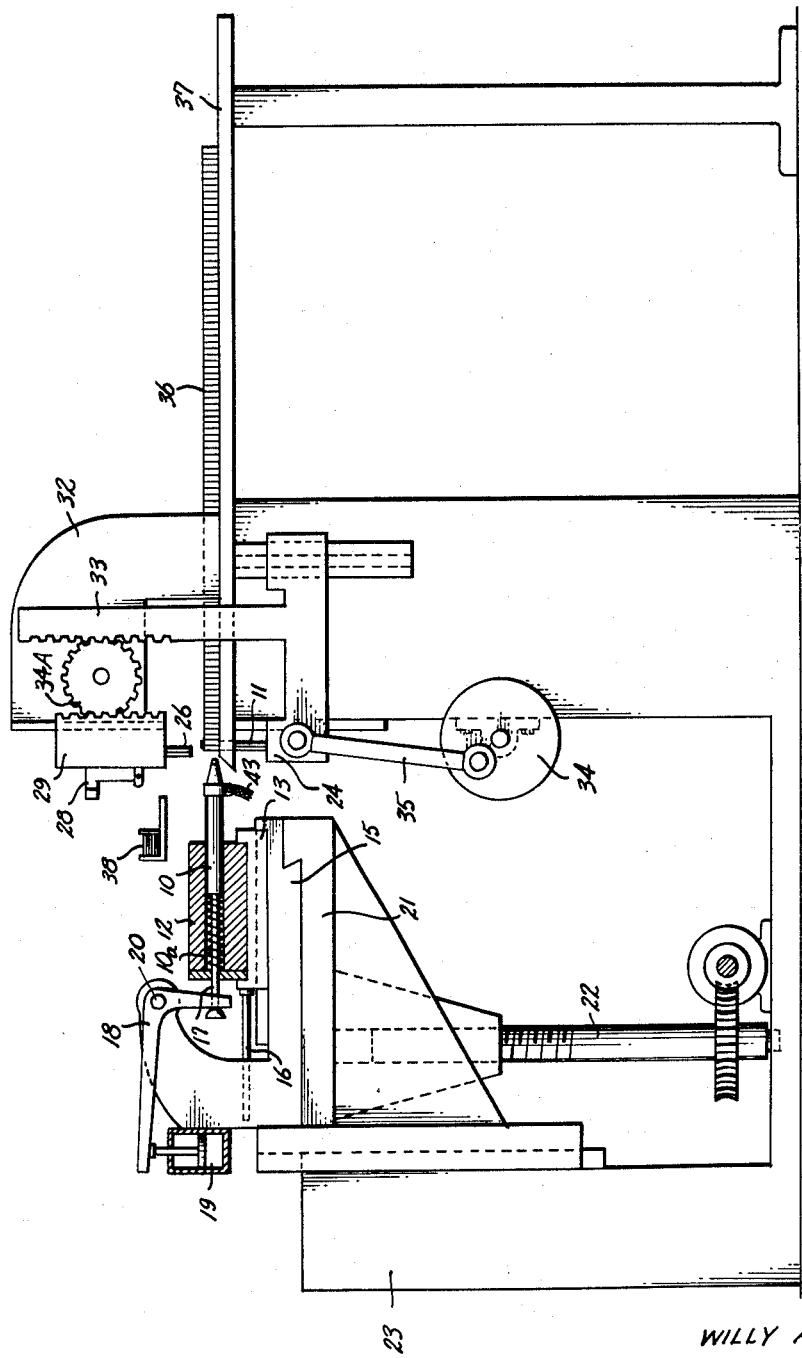
Fig. 1 is a side elevation of the welding machine.

The machine for producing honeycomb core panel in accordance with this invention includes a number of horizontal electrodes 10 and a number of vertical electrodes 11. The number of the electrodes 10 and the corresponding electrodes 11 depend on the number of nodes across the width of the panel to be produced. The electrodes 10 are printed and are slidably supported in a sectional insulating electrode-holder 12, which may comprise a group of said electrodes mounted in one line as close as the size of the electrodes permit and the distance of the nodes determine. Several of said sections 12 form the line of the electrodes 10, as determined by the width of the panel to be produced. The sections 12 are fixedly mounted in a support 13, which in turn is slidably resting in the bed 14 of a traverse 15. Threaded adjusting rods 16 determine the position of the support 13 in respect to the longitudinal axis of the electrodes 10, herewith regulating via the spring 10a the welding pressure of the electrodes 10. An insulating extension shaft 17 connects the electrodes 10 with the lever 18 in a way, that said electrodes may be retracted from the work piece by means of the lever 18, which is operated by a hydraulic cylinder 19. A traverse or part 15 supports the necessary number of levers 18 by means of bearings 20, whereby one lever, operated by one hydraulic cylinder 19, may in turn operate a group of electrodes 10. The traverse or part 15 is slidably disposed in a bed 21, able to index the electrodes 10 from node to node of the working piece. The bed 21 is resting on a screw jack structure 22 and is slidably mounted on the face of a heavy frame 23. By means of turning shaft 22 right or left the bed 21 moves up or down moving the electrodes 10 vertically along the nodes to be welded.

Figure 3:
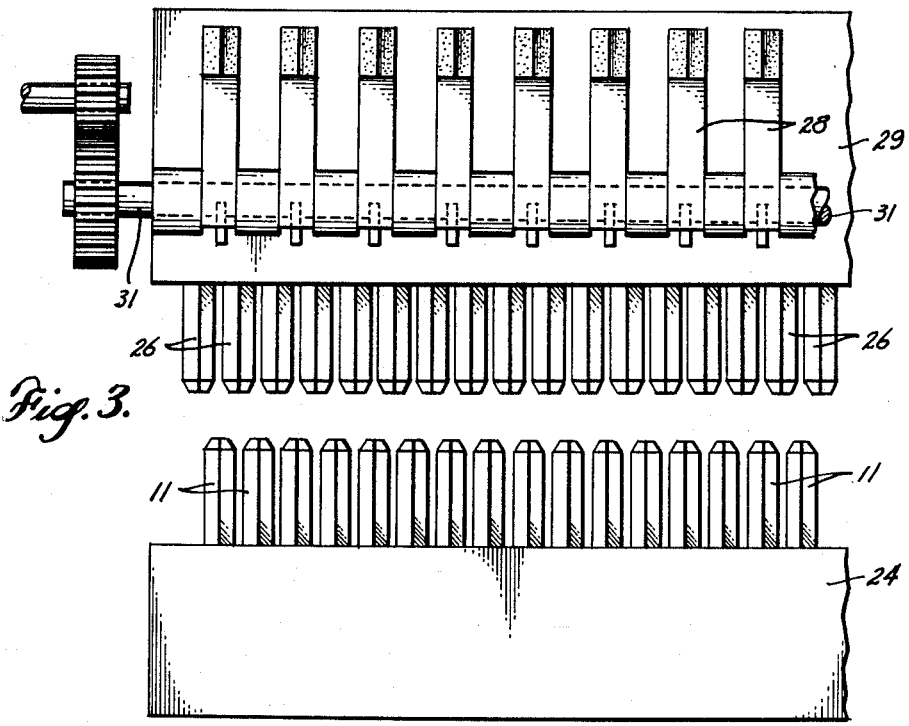
Fig. 3 is a frontal sectional view taken on the line 2—2 of Fig. 1.
Figure 4:
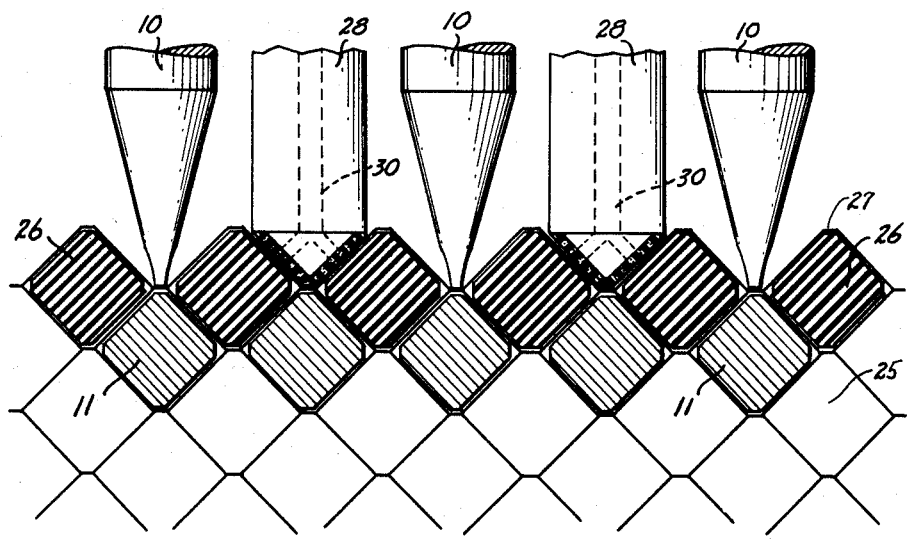
Fig. 4 is a horizontal sectional view taken on the line 3—3 of Fig. 1.

The coacting electrodes 11 are fixedly mounted in a vertically movable electrode holder 24. The number of electrodes 11 depend on the number of cells 25 across the width of the panel, so that each cell 25 is supplied with one electrode 11, thus building a toothlike formation as clearly shown in Fig. 3. In accordance to the electrodes 11, a similar formation is built by the teeth 26, which are in form and shape similar to the electrodes 11 but fabricated from insulating material. The insulating teeth 26 perform the function of holding the strip to be welded 27 with the assistance of an especially designed holding and pickup arm 28 with the ridges of the strips to be welded in proper position, and assuring the preservation of the newly formed cell during the welding process, clearly visible in Fig. 4. The insulating teeth 26 are fixedly placed in a vertically slidable holder 29, but may as well as the electrodes 11 be extended to a length, suitable for any desired core-thickness. The holding or vacuum pickup arm 28 is faced with apertured sponge rubber pads 30 in order to select and hold a foil strip by suction from any suitable source.

Figure 2:
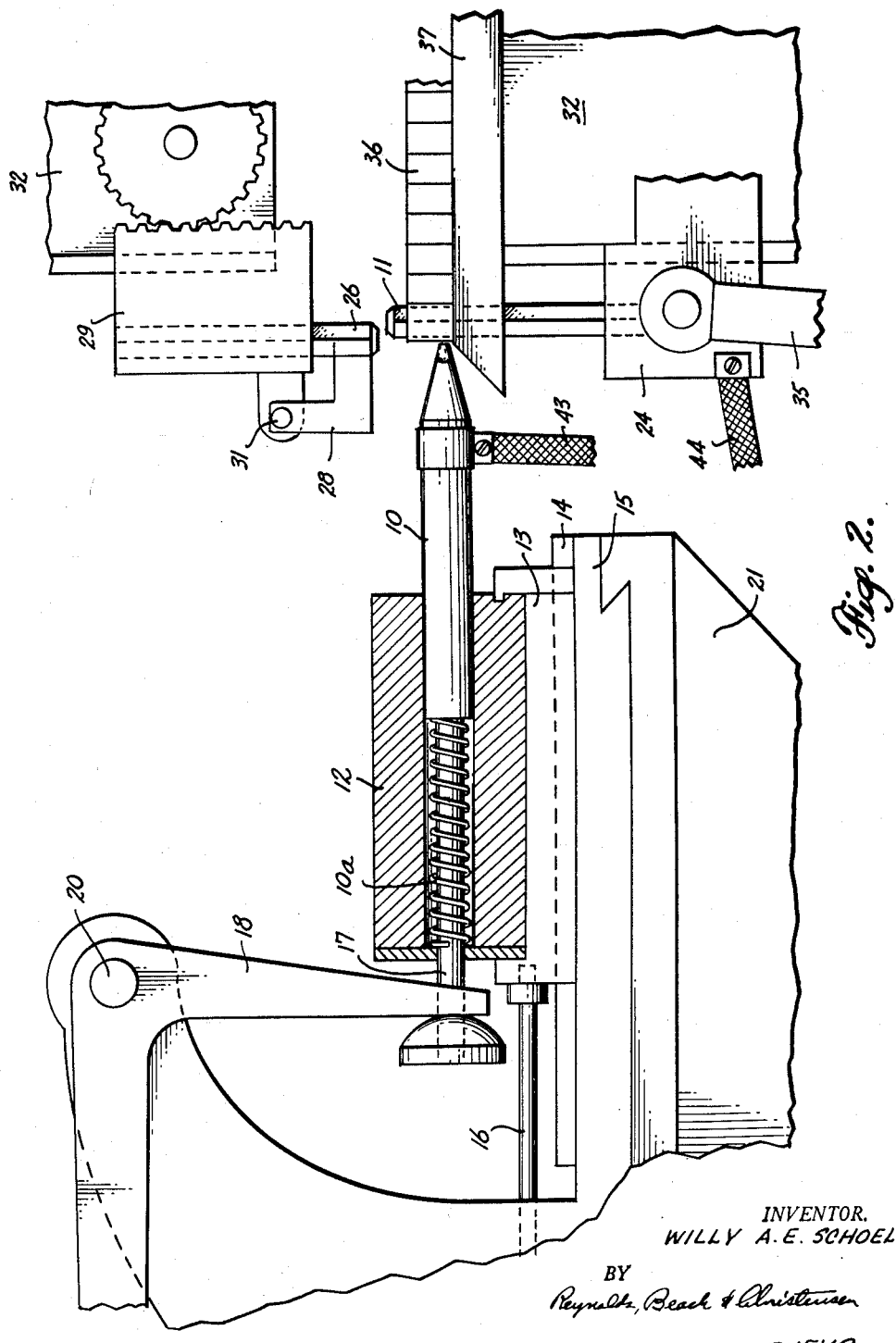
Fig. 2 is an enlarged portion of Fig. 1, covering the electrodes and holders.
Figure 5:
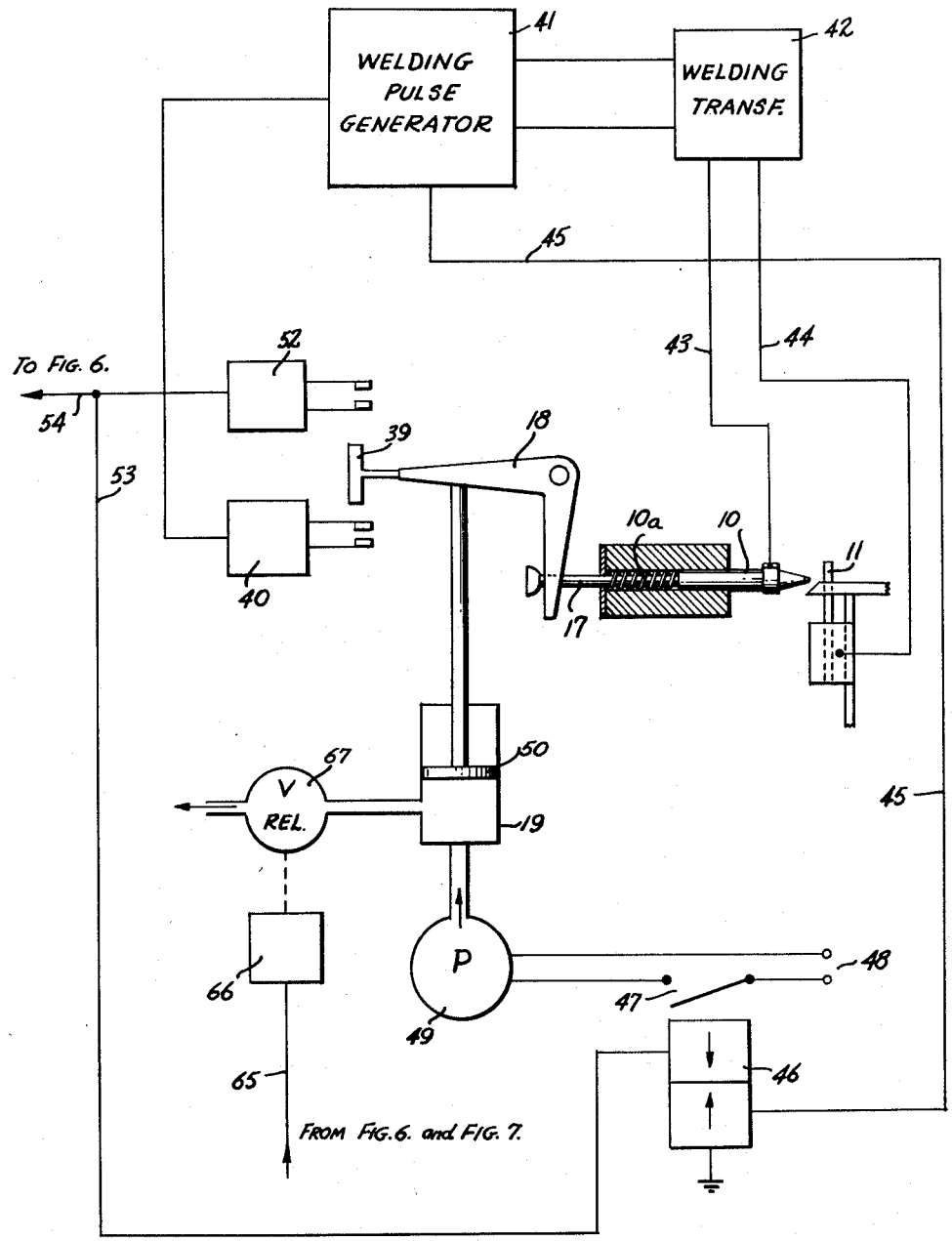
Fig. 5 is a part of the schematic diagram, covering a part of the function of the machine.
Figure 6:
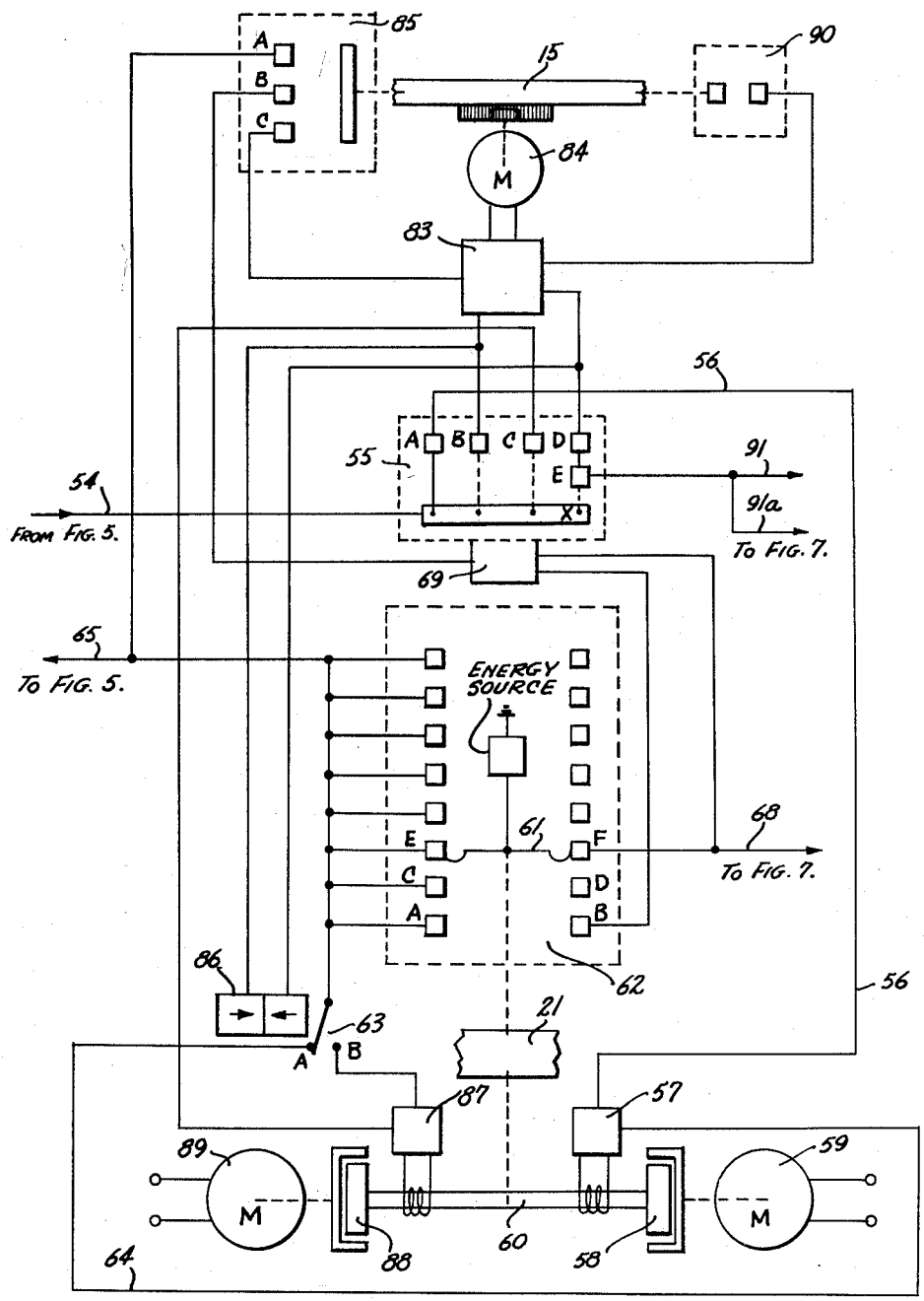
Fig. 6 is a part of the schematic diagram, covering a part of the function of the machine.
Figure 7:
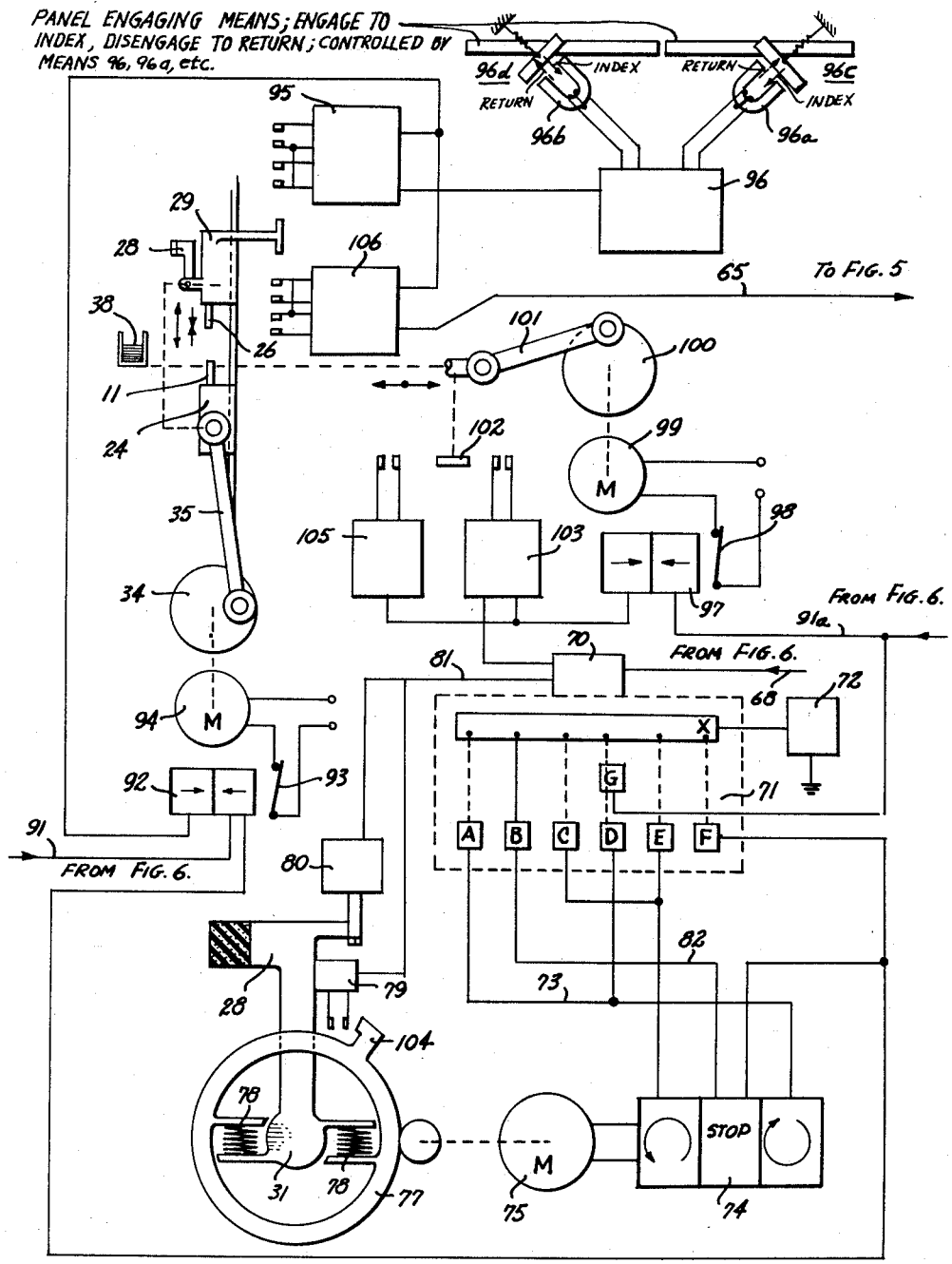
Fig. 7 is a part of the schematic diagram, covering a part of the function of the machine.

The pick-up arms 28 are mounted on a common axle 31 and spaced to be able to fit in between the electrodes 11 without short circuiting. The electrode holder 24 as well as the insulating teeth holder 29 are slidably mounted on a frame 32, in a manner that the opposite movement of the holders is synchronized by suitable mechanical means as for instance a gear mechanism, whereby a rack 33 is mechanically connected with the holder 24 and an idler gear 34A moves the holder 29 into the opposite direction to that of the holder 24 when it is moved by the connecting rod 35. The position and movements of the holders 24 and 29 are controlled by suitable mechanical means as for instance by crank-wheel 34 via the connection rod 35. The work piece 36 rests on a work table 37, and is in Fig. 1 and Fig. 2 engaged by the electrodes 11, while the insulating teeth 26 are retracted for better visibility. The electrodes 11 are guided suitably in their movement in the work table. The arms 28 are shown in Fig. 2 in a strip-holding position but without engaging a strip, and in Fig. 1 in a position ready to select a new strip out of the magazine 38. The mechanism to move the magazine in and out of the pickup position is for clearer visibility of other parts not shown in Fig. 1, but described in Fig. 7. The Figures 5, 6 and 7 represent a coherent schematic diagram, covering the function of the machine in the chronological sequence of the welding process. For a better understanding the expression "second node" and "first node" will be utilized again in this description, whereby the work-cycle starts with the lowest welding position of the second nodes, assuming that the number of electrodes 10 represent 50% of the number of nodes to be welded, as the given example describes.

While the electrodes 10 are moving into their first welding position in the beginning of one work-cycle the welding pressure will be applied to the work piece and the lever 18 will be operated via a mechanically connected switch lever 39 at the same instance as the pressure is applied to a control switch 40 to close its contacts. Switch 40, see Figure 5, operates the welding pulse generator 41 and releases from there a number of suitable welding pulses in a fast sequence, whereby the number of welding pulses released equalize the number of electrodes 10. To achieve the fastest possible speed it is advisable, to utilize as many welding transformers as there are pointed electrodes 10, connecting each electrode 10 with its own transformer via the connecting lines 43, while the electrodes 11 are interconnected, closing the welding circuit via the connecting lines 44.

It is however possible, to use only one welding transformer by utilizing a special designed switch, which automatically connects the welding transformer with the electrodes 10 in a sequence as fast as possible.

The last welding pulse, completing the sequence of pulses, is utilized at the same instance as a control pulse and operating via the connection 45 and a relay 46, will close the switch 47, see Figure 5. Switch 47 being closed energizes via the line connection 48 the motor of the hydraulic pump 49, which lifts the piston 50 of the hydraulic cylinder 19. The piston 50 is mechanically connected with the lever 18, which will be lifted by the above operation and withdraws at the same time as the electrodes 10 from the work piece. This operation continues until the contact lever 39 operates switch 52, which operates via the connection 53 and the relay 46, causing the switch 47 to open, thereby stopping the lifting of lever 18. Switch 52 controls at the same instance via the connection 54 and the contact X—A of a solenoid operated drumtype switch 55, see Fig. 6, also via the connection 56 a switch 57. Switch 57 engages a magnetic clutch 58, whereby the motor 59 turns the axle 60 and via a connecting worm gear shafts 22 in a direction, so that bed 21 is lifted, thereby lifting the electrodes 10 vertically into the next welding position. The bed 21 is mechanically connected to the selector contact bridge 61 of a selector switch 62. By lifting the bed 21, the selector contact bridge 61 moves from its position A—B into the position C—D of the switch 62, whereby contact C of switch 62 leads a control pulse transmitted by the selector contact bridge 61, via the switch 63 contact A and the connection 64 to the switch 57, causing the disengagement of the magnetic clutch 58. At the same instance said control pulse also is carried via the connection 65 to an operational switch 66, which operates a pressure release valve 67, see Figure 5, causing the pressure release in the hydraulic cylinder 19. The lever 18 releases the electrodes 10 to move into the next higher welding position. At the instant the electrodes 10 are applied to the work piece, switch 40 releases the sequence of welding pulses again with the before described procedure. The last welding pulse also releases the before described action, and the selector contact bridge 61 now will move into the position E—F. This position is selected as the end position of the upward movement by connecting line 68 to contact F. Line 68 is pre-set according to the thickness of the panel required. The upward directed welding procedure will continue until this connection is reached.

While the welding procedure is released as previously described, but this time by contact E, contact F leads the control pulse via line 68 first to solenoid 69 of switch 55, see Figure 6, causing the switch to move from position X—A to position X—B. At the same instant said control pulse is led to the solenoid 70 of drumtype switch 71 in Fig. 7, which causes the switch 71 to move from the position X—F to the position X—A. By this a control pulse, released by a supply 72, operates via the connection 73 a polarity switch 74, which in turn energizes a reversible motor 75.

Said motor drives the mechanism for turning the holding and pickup arms 28, which are designed in such a manner that their axle 31 is driven by a hollow stem 77 connected by springs 78 to the axle 31, allowing a certain amount of pressure on the foam rubber face of 28 before the turning movement is stopped by means of switch 79.

By energizing the motor 75 at this stage of the welding process, the arms 28 are moved out of their holding position on the first node, turning upward until their movement is stopped by switch 80. Said switch releases at this instant a pulse via connection 81 to the solenoid 70 of switch 71, which moves from position X—A into position X—B. The supply 72 in turn releases a control pulse via X—B and the connection 82, herewith stopping motor 75.

When the welding of the last upper row of spots on the second nodes is completed, the switch 55 is in position X—B and switch 71 also is in position X—B. The first nodes, occupied prior to this stage by the strip holders 28, are free now for the electrodes 10 to move in. The last welding pulse causes as usual the lift of the lever 18, closing switch 52, whereby the control pulse supplied by 52 now is led via the connection 54, and the switch 55 contact X—B to a polarity switch 83, and at the same time to relay 86, causing switch 63 to move into position B.

The polarity switch 83 energizes the motor 84 in a way, that the traverse 15 is by the proper mechanical means indexed to a position, where the electrodes 10 are now in line with the first nodes to be welded. This movement is controlled by switch 85 contact C, which stops the motor 84 in the proper position. At the same time switch 85 contact B energizes the solenoid 69, causing switch 55 to move into the position X—C. Contact A of switch 85 leads via connection 65 a control pulse to switch 66, causing the pressure release valve 67 to operate, releasing lever 18 and closing switch 40, see Figure 5.

Herewith is the first sequence of welding pulses released on the upper line of the first or left nodes to be welded. The last welding pulse of the pulse sequence operates as usual with the before described procedure the lever 18, closing herewith switch 52. The control pulse released by 52 now travels via connection 54 and switch 55, and connection X—C to the switch 87, which engages a magnetic clutch 88, herewith turning via motor 89 the axle 60 in a way, that the bed 21 is moved downward to the next welding position until selector contact bridge 61 of switch 62 contacts connection C—D, herewith stopping the movement via switch 63 contact B, causing the disengagement of the magnetic clutch 88. At the same instant switch 66, Figure 5, is operated via connection 65, releasing the necessary operation to weld the second row of spots in the downward welding operation. After completing this operation, selector contact bridge 61 of switch 62 is finally moved into the position A—B, which represents the last stage of the second half of one complete work-cycle as well as the first stage of the following work-cycle.

Contact A of switch 62 disengages the magnetic clutch 88 and releases the electrodes to complete the last part of one work-cycle. While this occurs, the next work-cycle is prepared by the following action: Contact B of switch 62 operates the solenoid 69 of switch 55, moving the contact of said switch into position X—E—D. After completing the last weld, lever 18 operates switch 52 in the usual manner. The control pulse coming from switch 52 operates via connection 54 and contact X—D of switch 55 the polarity switch 83, which energizes the motor 84 in a way, that the support 15 is indexed into its previous second node position. This movement is stopped by the switch 90, which controls the exact welding position. At the same time connection X—D of switch 55 operates via the relay 86 the switch 63, closing the contact in the position A.

Contact X—E of switch 55 leads the control pulse via connection 91 to the relay 92, which closes herewith switch 93, energizing motor 94. Said motor operates by suitable mechanical means, for example a crank 34 and connection rod 35, the electrode holder 24 as well as the tooth-holder 29 in a way, that both holders pull the row of electrodes and insulation teeth out of their position, disengaging the panel. This movement is stopped by the switch 95, which operates relay 92, causing the switch 93 to open. Another contact of switch 95 operates switch 96, which energizes suitable means for indexing the panel in a way, that the newly formed cells can be occupied by the electrodes 11. One suitable means for shifting the panel on its support 37 for such indexing purposes comprises the two electromagnets 96a and 96b and their cooperating armatures 96c and 96d, respectively. On one cycle one electromagnet operates to shift the panel a predetermined distance along the length of support 37 and toward one side thereof, and on the succeeding cycle the other electromagnet operates to shift the panel by the same predetermined distance along the length of the support and toward the opposite side thereof. Thus, the switch 96 comprises a suitable scale-of-two circuit or apparatus, of which there are various suitable types known in the art, capable of operating the electromagnets in alternate sequence on succeeding indexing cycles. It will also be evident that, in the example, the electromagnet armatures each include or cooperate with suitable means engageable with the panel upon or immediately preceding electromagnet energization so as to shift the panel with each such energization, and that the panel engaging means and armatures include suitable self-return means for effecting their disengagement from the panel followed by return movement through the predetermined distances mentioned above to their respective starting positions following such indexing movements. As will be obvious, the panel engaging means may engage the panel frictionally, as by bearing against the top edges of the honeycomb strips or may include elements which actually enter a number of the honeycomb cell spaces to engage the panel for more positively engaging the panel to effect the described indexing movements. The sequences of (1) panel engagement, then (2) panel shifting may obviously be effected in a mechanical manner by dividing the stroke of the electromagnet armature into corresponding definite phases. Alternatively, switch 96 may, of course, be arranged to initiate the panel engagement operation of a particular armature means before it initiates the electromagnet energization to effectuate panel shifting. The general illustration in Figure 7 depicts these relationships, but details have been largely omitted since they may vary and since they are of secondary concern for present purposes.

Contact X—E of switch 55 also leads the control pulse via connection 91a, energizing relay 97, closing switch 98, herewith energizing the motor 99. By suitable mechanical means, as for instance crank-wheel 100 and connection rod 101, the motor 99 brings the foil magazine 38 in a position, where a new preformed foil strip can be selected by the holding and pickup arms 28. As soon as this position is reached, a switch-lever 102, mechanically connected with the magazine 38 operates the switch 103, which stops the movement via relay 97 and operates at the same time the solenoid 70 of switch 71. Said switch connects the position X—C, energizing via relay 74 the motor 75 in a manner, that the arms 28 will be pressed against the upper strip with a pressure, determined by the strength of the springs 78 and the distance of the switch-lever 104 from the contacts of switch 79. As soon as switch 79 closes, the solenoid 70 is energized by said switch and moves the contact of switch 71 into position X—G—D. While contact X—D of switch 71 causes the arms 28 to move up, the contact X—G energizes relay 97, causing the magazine 38 to move out of the pickup position. This movement is stopped by switch 105 by means of energizing relay 97, causing the switch 98 to open. The arms 28 are moving upward with the foil strip until switch 80 is closed again, energizing the solenoid 70 of switch 71, causing the contact of switch 71 to move into position X—E. By that the motor 75 is energized and turns the arms 28 downward until the strip is securely pressed against the insulation teeth. Switch 79 closes at this instance, hereby energizing the solenoid 70, which moves the contact of switch 71 from position X—E into position X—F. Contacts X—F stops the motor 75, also energizes relay 92, closing herewith switch 93. The now energized motor 94 brings via the previous described mechanical means the electrodes 11 and the insulating teeth 26 together with the new foil strip to be weided into the proper welding position. This movement is controlled and stopped by switch 106, which also releases via connection 65 the electrodes 10, starting herewith the first step in the new work-cycle. It is, of course, possible to replace the motors 89 and 59 by only one reversible motor with or without magnetic clutch, or by only one not reversible motor and a gear shift in connection herewith. The electrode tips of the pointed electrodes 10 are exchangeable by means of a mechanical connection to the electrode body, herewith preventing a complicated and time wasting exchange of worn electrodes.

It is obvious, that minor changes are possible in the form, construction and arrangement of some parts without deviating from the spirit of the invention. Therefore, I do not wish to limit myself to the exact construction and arrangement as shown and described herein.

What I claim as new and desire to secure by Letters Patent of the United States is:

1. Apparatus for fabricating by welding a honeycomb core panel from corrugated metal foil strips, said apparatus comprising core panel support means having a welding station at one end thereof extending in a line transversely thereto, a plurality of finger electrodes disposed in generally parallel relationship extending in series along the line of said welding station, means mounting said electrodes for joint movement thereof perpendicularly to the plane of a core panel resting on said support, said finger electrodes being formed to permit insertion and retraction thereof into and from transversely aligned honeycomb core spaces by such movement and having corresponding edges fronting along said welding station line conforming to the outer nodes of a corrugated strip at the end of a core panel under fabrication, magazine means mounted adjacent to said welding station to supply fresh strips, strip applicator means including a plurality of strip-pickup elements and means mounting such elements in series alignment extending substantially parallel to said station line and guiding the same for movement of the individual elements in respective parallel planes registering with finger electrodes at alternate nodal locations, means effecting relative movement between said magazine means and said pickup mounting means to effect pickup engagement with a fresh strip at alternate nodal locations thereon, means for actuating said pickup mounting means to apply and hold the fresh strip in welding position against the fabricated end of the panel, a series of movable electrodes, said series extending adjacent to and along said welding station, means mounting said movable electrodes for establishing welding contact thereof with finger-electrode-backed nodes of such applied strip intervening the pickup-engaged nodes, means operable for retracting said movable electrodes from the end of the panel to permit application thereto of a fresh strip by the strip applicator means, means operable for delivering welding current to the sets of mutually opposing finger and movable electrodes for welding together the mutually contacting nodes therebetween with the strip held by the pickup elements, means operable upon termination of such welding current to retract said pickup elements from engagement with said applied strip, means operable upon such latter retraction to apply said movable electrodes to the intervening nodes theretofore occupied by said pickup elements and to weld such nodes, and means for effecting incremental advance of the panel away from the welding station with said finger electrodes retracted from the panel, preparatory to application of a fresh strip for welding.

2. The apparatus defined in claim 1, further comprising a series of finger supports disposed in generally parallel relationship and extending in series along said welding station, means mounting said finger supports for movement into and from interdigitated relationship with the finger electrodes and offset therefrom for insertion into the immediately adjacent row of core spaces being formed at the very end of the panel, said finger supports being formed with side faces which engage and support the corrugations during application and welding of an applied fresh strip, and means effecting retraction of said finger supports with retraction of the finger electrodes.

3. The apparatus as defined in claim 2, wherein the finger supports comprise electrical insulation material.

4. The apparatus as defined in claim 2, wherein the pickup elements have faces disposed in angular relationship to engage the corrugation sides of a fresh strip, and thereby establish uniform area contact of the corrugated strip between such pickup faces and the opposing faces of the finger supports.

5. The apparatus defined in claim 3, wherein the pickup faces have openings therein, and means comprising a source of suction connected through said pickups to said openings to apply suction to a strip, thereby to hold such strip for removal from the magazine means and transfer into welding position on the end of the panel being fabricated.

6. The apparatus defined in claim 5, wherein the pickups have layers of porous elastic material overlying the strip contact faces thereof for establishing uniformity of pressure against the strip corrugation sides and for distributing suction applied to such corrugation sides.

7. The apparatus defined in claim 1, wherein the movable electrodes have strip-contacting points which extend a small fraction of the distance along the length of the nodes being welded, the mounting means for such latter electrodes further comprising means to permit movement of the same progressively along the length of such nodes, and means operable on termination of welding current delivered to said electrodes for retracting, advancing by a definite increment along said nodes and reapplying said electrodes, thereby to weld by a succession of separately formed spot welds.

8. The apparatus defined in claim 7, wherein the means supplying welding current to the sets of opposing movable and finger electrodes comprises a source of energy, circuit means having a plurality of separate energizing channels connected individually to the respective sets of electrodes, and coordinated rapid-sequence switching means in the respective channels for applying energy pulses in successive order to the respective sets of electrodes in each incrementally advanced position of the movable electrodes along the welding nodes.

9. The apparatus defined in claim 1, wherein the means supplying welding current to the sets of opposing movable and finger electrodes comprises a source of energy, circuit means having a plurality of separate energizing channels connected individually to the respective sets of electrodes, and coordinated rapid-sequence switching means in the respective channels for applying energy pulses in successive order to the respective sets of electrodes in each incrementally advanced position of the movable electrodes along the welding nodes.

10. The apparatus defined in claim 1, wherein the movable electrodes have strip-contacting points which extend a small fraction of the distance along the length of the nodes being welded, the mounting means for such latter electrodes further comprising means to permit movement of the same progressively along the length of such nodes, and wherein the means supplying welding current to the sets of opposing movable and finger electrodes comprises a source of energy, circuit means having a plurality of separate energizing channels connected individually to the respective sets of electrodes, and coordinated rapid-sequence switching means in the respective channels for applying energy pulses in successive order to the respective sets of electrodes recurringly during progressive advance of the movable electrodes along the welding nodes.

11. Apparatus for fabricating by welding a honeycomb core panel from corrugated metal foil strips, said apparatus comprising generally horizontally disposed core panel support means having a welding station at one end thereof extending in a line transversely thereto, a plurality of substantially vertical finger electrodes disposed in generally parallel relationship extending in series along the line of said welding station, means mounting said electrodes for joint movement thereof perpendicularly to the plane of a core panel resting on said support, said finger electrodes being formed to permit insertion and retraction thereof into and from transversely aligned honeycomb core spaces by such movement and having corresponding edges fronting along said welding station line conforming to the outer nodes of a corrugated strip at the end of a core panel under fabrication, magazine means mounted adjacent to said welding station to supply fresh strips, strip applicator means including a plurality of strip-pickup elements and means mounting such elements in series alignment extending substantially parallel to said station line and guiding the same for movement of the individual elements jointly in respective parallel planes registering with finger electrodes at alternate nodal locations, means effecting relative movement between said magazine means and said pickup mounting means to effect pickup engagement with a fresh strip at alternate nodal locations thereon, means for actuating said pickup mounting means to apply and hold the fresh strip in welding position against the fabricated end of the panel, a series of horizontally disposed movable electrodes, said series extending adjacent to and along said welding station, means mounting said horizontally disposed movable electrodes for establishing welding contact thereof with finger-electrode-backed nodes of such applied strip intervening the pickup-engaged nodes, means operable for retracting said horizontally disposed movable electrodes from the end of the panel to permit application thereto of a fresh strip by the strip applicator means, means operable for delivering welding current to the sets of mutually opposing finger and movable electrodes for welding together the mutually contacting nodes therebetween with the strip held by the pickup elements, means operable upon termination of such welding current to retract said pickup elements from engagement with said applied strip, means operable upon such latter retraction to apply said horizontally disposed movable electrodes to the intervening nodes theretofore occupied by said pickup elements and to weld such nodes, and means for effecting incremental advance of the panel away from the welding station with said finger electrodes retracted from the panel, preparatory to application of a fresh strip for welding.

12. The apparatus defined in claim 11, further comprising a series of finger supports disposed in generally parallel relationship and extending in series along said welding station, means mounting said finger supports for movement into and from interdigitated relationship with the finger electrodes and offset therefrom for insertion into the immediately adjacent row of core spaces being formed at the very end of the panel, said finger supports being formed with side faces which engage and support the corrugations during application and welding of an applied fresh strip, and means effecting retraction of said finger supports simultaneously with retraction of the finger electrodes, the respective mounting means for the finger supports and finger electrodes being coordinated and operable to retract oppositely from the core panel.

13. Apparatus for fabricating by welding a honeycomb core panel from corrugated metal foil strips, said apparatus comprising core panel support means having a welding station at one end thereof extending in a line transversely thereto, a plurality of finger electrodes disposed in generally parallel relationship extending in series along the line of said welding station, means mounting said electrodes for joint movement thereof perpendicularly to the plane of a core panel resting on said support, said finger electrodes being formed to permit insertion and retraction thereof into and from transversely aligned honeycomb core spaces by such movement and having corresponding edges fronting along said welding station line conforming to the outer nodes of a corrugated strip at the end of a core panel under fabrication, magazine means mounted adjacent to said welding station to supply fresh strips, strip applicator means including a plurality of strip-pickup elements and means mounting such elements in series alignment extending substantially parallel to said station line and guiding the same for movement of the individual elements jointly in respective parallel planes registering with finger electrodes at alternate nodal locations, means effecting relative movement between said magazine means and said pickup mounting means to effect pickup engagement with a fresh strip at alternate nodal locations thereon, means for actuating said pickup mounting means to apply and hold the fresh strip in welding position against the fabricated end of the panel, a series of movable electrodes, said series extending adjacent to and along said welding station, means mounting said movable electrodes for establishing welding contact thereof with finger-electrode-backed nodes of such applied strip intervening the pick-up engaged nodes, means operable for retracting said movable electrodes from the end of the panel to permit application thereto of a fresh strip by the strip applicator means, means operable for delivering welding current to the sets of mutually opposing finger and movable electrodes for welding together the mutually contacting nodes therebetween with the strip held by the pickup elements, means operable upon termination of such welding current to retract said pickup elements from engagement with said applied strip, means operable upon such latter retraction to apply said movable electrodes to the intervening nodes theretofore occupied by said pickup elements and to weld such nodes, and means for effecting incremental advance of the panel away from the welding station with said finger electrodes retracted from the panel, preparatory to application of a fresh strip for welding, said movable electrodes having strip-contacting points which extend a small fraction of the distance along the length of the nodes being welded, means to move said movable electrodes progressively by increments in one direction along the length of the first set of nodes contacted thereby and in the opposite direction along the lengths of the interevning nodes, with the electrodes retracted from the strip and returned to the strip at the beginning and end of each incremental movement.

14. Apparatus for fabricating by welding a honeycomb core panel from corrugated metal foil strips, said apparatus comprising frame means having a welding station at one end thereof extending in a line transversely to the direction of advance of a core panel being formed progressively by said apparatus, a plurality of finger electrodes disposed in generally parallel relationship extending in series along the line of said welding station, means mounting said electrodes for joint movement thereof perpendicular to the plane of such a core panel, said finger electrodes being formed to permit insertion and retraction thereof into and from transversely aligned honeycomb core spaces by such movement and having corresponding edges fronting along said welding station line conforming to the outer nodes of a corrugated strip at the end of a core panel under fabrication, magazine means mounted adjacent to said welding station to supply fresh strips, strip applicator means including a plurality of strip-pickup elements and means mounting such elements in series alignment extending substantially parallel to said station line and guiding the same for movement of the individual elements jointly in respective parallel planes registering with finger electrodes at alternate nodal locations, means effecting relative movement between said magazine means and said pickup mounting means to effect pickup engagement with a fresh strip at alternate nodal locations thereon, means for actuating said pickup mounting means to apply and hold the fresh strip in welding position against the fabricated end of the panel engaged by said finger electrodes, a series of movable electrodes, said series extending adjacent to and along said welding station, means mounting said movable electrodes for establishing welding contact thereof with finger-electrode-backed nodes of such applied strip intervening the pickup-engaged nodes, means operable for retracting said movable electrodes from the end of the panel to permit application thereto of a fresh strip by the strip applicator means, means operable for delivering welding current to the sets of mutually opposing finger and movable electrodes for welding together the mutually contacting nodes therebetween with the strip held by the pickup elements, and means for effecting incremental advance of the panel away from the welding station with said finger electrodes retracted from the panel, preparatory to application of a fresh strip for welding.

15. The apparatus defined in claim 14, further comprising a series of finger supports disposed in generally parallel relationship and extending in series along said welding station, means mounting said finger supports for movement into and from interdigitated relationship with the finger electrodes and offset therefrom for insertion into the immediately adjacent row of core spaces being formed at the very end of the panel, said finger supports being formed with side faces which engage and support the corrugations during application and welding of an applied fresh strip.

16. The apparatus defined in claim 15, wherein the movable electrodes have strip-contacting points which extend a small fraction of the distance along the length of the nodes being welded, the mounting means for such latter electrodes further comprising means to permit movement of the same progressively along the length of such nodes, and means operable on termination of welding current delivered to said electrodes for retracting, advancing by a definite increment along said nodes and reapplying said electrodes, thereby to weld by a succession of separately formed spot welds.

17. The apparatus defined in claim 14, wherein the pickup mounting means comprises a rotary member mounted with its rotation axis disposed parallel to the welding sttaion line and having thereon a plurality of substantially parallel arms mounted in successively spaced relationship along said rotary member, said arms carrying the individual pickup elements to follow a path of swing intercepted by the end of the core panel under fabrication, and means to move the magazine means into and from the path of swing of the pickup elements to permit removal of fresh strips therefrom for application to the core panel end, in welding position.

18. The apparatus defined in claim 17, wherein the pickup faces have openings therein, and means comprising a source of suction connected through said pickups to said openings to apply suction to a strip, thereby to hold such strip for removal from the magazine means and transfer into welding position on the end of the panel being fabricated.

19. Apparatus for fabricating by welding a honeycomb core panel from corrugated metal foil strips, said apparatus comprising generally horizontally disposed core panel support means having a welding station at one end thereof extending in a line transversely thereto, a plurality of substantially vertical finger electrodes disposed in generally parallel relationship extending in series along the line of said welding station, means mounting said electrodes for joint movement thereof perpendicularly to the plane of a core panel resting on said support, said finger electrodes being formed to permit insertion and retraction thereof into and from transversely aligned honeycomb core spaces by such movement and having corresponding edges fronting along said welding station line conforming to the outer nodes of a corrugated strip at the end of a core panel under fabrication, magazine means mounted adjacent to said welding station to supply fresh strips, strip applicator means including a plurality of strip-pickup elements and means mounting such elements in series alignment extending substantially parallel to said station line and guiding the same for movement of the individual elements jointly in respective parallel planes registering with finger electrodes at alternate nodal locations, means effecting relative movement between said magazine means and said pickup mounting means to effect pickup engagement with a fresh strip at alternate nodal locations thereon, means for actuating said pickup mounting means to apply the fresh strip in welding position against the fabricated end of the panel, a series of horizontally disposed movable electrodes, said series extending adjacent to and along said welding station, means mounting said horizonally disposed movable electrodes for establishing welding contact thereof with finger-electrode-backed nodes of such applied strip intervening the pickup-engaged nodes, means operable for retracting said horizontally disposed movable electrodes from the end of the panel to permit application thereto of a fresh strip by the strip applicator means, means operable for delivering welding current to the sets of mutually opposing finger and movable electrodes for welding together the mutually contacting nodes therebetween, and means for effecting incremental advance of the panel away from the welding station with said finger electrodes retracted from the panel, preparatory to application of a fresh strip for welding.

20. Apparatus for fabricating honeycomb core panel from successively applied foil strips, comprising core panel guide means along which the core panel advances in process of formation, a welding station at the head end of said guide means, a transverse row of elongated finger electrodes at said welding station normally inserted through the last-formed row of core spaces in the panel to bear against the outer nodes thereof, a row of elongated finger supports interdigitated with said finger electrodes and offset therefrom, normally occupying the exterior spaces between and adjacent said respective core spaces, a row of spot welding electrodes mounted to bear, tranversely to said finger electrodes, against finger-electrode-backed nodal points on a corrugated strip overlying said finger supports, a row of presser elements mounted to bear transversely to said finger electrodes against intervening nodal regions of said overlying strip backed by mutually adjacent finger supports, means to effect relative operating movement between said core panel and spot weld electrodes progressively by increments to spot weld along the nodes engaged thereby with the strip held stationary on the panel's end by said presser elements, means operable thereafter to effect relative retraction of the presser elements from said strip, means thereupon operable to effect relative transverse movement between said row of spot weld electrodes and the panel by at least the width of a full corrugation and for spot welding along intervening nodes.

21. The apparatus defined in claim 20, wherein the presser elements comprise suction pickups adapted to lift and transfer a strip into welding position, strip support means adapted to position a supported strip in the path of movement of said presser elements in the direction toward the panel end for pickup engagement of such strip, and to retract from such path to permit application of the strip in welding position to the panel's end.

References Cited in the file of this patent

UNITED STATES PATENTS

| | | |
|---|---|---|
| 2,256,246 | Geibel | Sept. 16, 1941 |
| 2,747,064 | Pappelendam | May 22, 1956 |
| 2,780,716 | Wasilisin et al. | Feb. 5, 1957 |
| 2,814,718 | Hardesty et al. | Nov. 26, 1957 |
| 2,821,616 | Spott | Jan. 28, 1958 |
| 2,843,722 | Wegeforth | July 15, 1958 |